(12) United States Patent
Kaiba et al.

(10) Patent No.: US 10,691,987 B2
(45) Date of Patent: Jun. 23, 2020

(54) THREE-DIMENSIONAL PRINTING METHOD

(71) Applicant: RICOH COMPANY, LTD., Tokyo (JP)

(72) Inventors: Tadashi Kaiba, Tokyo (JP); Shuusei Murai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/415,340

(22) Filed: May 17, 2019

(65) Prior Publication Data

US 2019/0272454 A1  Sep. 5, 2019

Related U.S. Application Data

(63) Continuation of application No. 15/972,388, filed on May 7, 2018, now Pat. No. 10,339,430.

(30) Foreign Application Priority Data

May 16, 2017  (JP) .................................. 2017-096939

(51) Int. Cl.
*B41J 11/00* (2006.01)
*B41J 3/407* (2006.01)
(Continued)

(52) U.S. Cl.
CPC .......... *G06K 15/024* (2013.01); *B41J 3/4073* (2013.01); *B41J 11/008* (2013.01); *B41M 5/0047* (2013.01); *B41M 5/0088* (2013.01); *G06K 9/00664* (2013.01); *G06K 15/102* (2013.01); *G06K 15/1848* (2013.01);
(Continued)

(58) Field of Classification Search
CPC .... B41J 3/4073; B41J 11/008; B41M 5/0047; B41M 5/0088; G06K 9/00664; G06K 15/024; G06K 15/102; G06K 15/1848; G06T 7/70; G06T 17/00; H04N 7/185; H04N 7/188; H04N 13/282; B60R 13/04
See application file for complete search history.

(56) References Cited

U.S. PATENT DOCUMENTS 4,831,549 A    5/1989  Red
5,931,166 A *  8/1999  Weber .................... A45D 29/00
                                                    132/73

(Continued)

FOREIGN PATENT DOCUMENTS

JP    09-156088    6/1997

*Primary Examiner* — Anh T Vo
(74) *Attorney, Agent, or Firm* — Wenderoth, Lind & Ponack, L.L.P.

(57) ABSTRACT

A predetermined area of a print surface is captured by a camera as a plurality of subdivided images to include an end edge portion of a previously printed image on a coating-target object, the end edge portion serving as a connection portion with an image to be drawn to be printed contiguous to the printed image, a composite print surface, which is a plane projection of the print-target surface which is non-plane, is created on the basis of the captured subdivided images, an edited image to be drawn is created by superimposing the image to be drawn on the composite print surface, and the image to be drawn is adjacently printed contiguous to the printed image on the basis of the edited image to be drawn.

20 Claims, 7 Drawing Sheets

(51) Int. Cl.
*G06K 15/10* (2006.01)
*G06K 9/00* (2006.01)
*B41M 5/00* (2006.01)
*G06K 15/02* (2006.01)
*H04N 13/282* (2018.01)
*H04N 7/18* (2006.01)
*G06T 17/00* (2006.01)
*B60R 13/04* (2006.01)

(52) U.S. Cl.
CPC ............ *G06T 17/00* (2013.01); *H04N 7/185* (2013.01); *H04N 7/188* (2013.01); *H04N 13/282* (2018.05); *B60R 13/04* (2013.01)

(56) References Cited

U.S. PATENT DOCUMENTS

| | | |
|---|---|---|
| 6,281,981 B1 | 8/2001 | Yasui |
| 9,028,026 B2 * | 5/2015 | Byun ..................... B41J 3/4073 347/14 |
| 2006/0051518 A1 | 3/2006 | Persson |
| 2009/0092312 A1 * | 4/2009 | Kasahara ........... G06K 9/00664 382/159 |
| 2010/0118079 A1 * | 5/2010 | Yamaguchi .......... B41J 2/04508 347/14 |
| 2017/0120527 A1 | 5/2017 | Miller |

* cited by examiner

THREE-DIMENSIONAL PRINTING METHOD

BACKGROUND

Technical Field

The present invention relates to a three-dimensional printing method, and more specifically to a three-dimensional printing method capable of continuously printing end edges of adjacent images in a case of adjacently printing a plurality of images on a surface of an object having a three-dimensional shape by an inkjet printer.

Related Art

A drawing method using an inkjet method has been proposed for coating vehicle bodies of automobiles and the like (JP 9-156088 A). However, a method of adjacently printing a plurality of images on a surface of an object having a three-dimensional shape, such as a vehicle body of an automobile or an aircraft, with inkjet nozzles supported on an X-Y table constituted by an X-axis moving mechanism and a Y-axis moving mechanism and moving on a coating-target surface in XY directions, has not been provided yet. In such a case, drawing has been directly performed by hands or printed films have been pasted together and applied.

SUMMARY

That is, in the case of adjacently printing a plurality of images on a surface of an object having a three-dimensional shape with inkjet nozzles mounted on an X-Y table, and for example, in a case of printing a two-dimensional rectangle on a surface (spherical surface) of a spherical object with the inkjet nozzles, as illustrated in FIG. 7A, an ink emitted through each of the inkjet nozzles mounted on a nozzle head 100 is discharged in a direction perpendicular to the nozzle head 100, and therefore, a rectangle having a shape of distorted peripheral sides, as illustrated in FIG. 7B, is printed on a surface of a coating-target object 101. Then, in a case where another rectangle image is further adjacently printed to a printed print image 102a in the X direction, a non-print area 103 that is an uncoated portion is generated between the print image 102a and a print image 102b, as illustrated in FIG. 7C. That is, there is a problem that adjacent end edge portions of the print image 102a and the print image 102b cannot be continuously printed. A boundary portion of the two print images may overlap in some cases depending on the shape of the surface of the object having a three-dimensional shape. Therefore, conventionally, there are no methods of adjacently and continuously printing a plurality of images on a three-dimensional coating-target object by an inkjet method, and in the case of printing an image on a three-dimensional body, drawing needs to be directly performed by hands or printed films need to be pasted together and applied.

Therefore, the present invention has been made in view of the problem and an object is to provide a three-dimensional printing method capable of continuously performing printing without leaving an uncoated portion or causing an overlapping portion in adjacent side portions of each printed images even in a case of adjacently printing a plurality of images on a surface of an object having a three-dimensional shape with inkjet nozzles mounted on an X-Y table.

To solve the above-described problem, the invention according to claim 1 is a three-dimensional printing method for printing an image having continuity as a whole by adjacently printing a plurality of images on a print-target surface including a non-plane portion by an inkjet nozzle attached to an XY table, the method including capturing a plurality of subdivided images by capturing a predetermined area of the print-target surface at fixed intervals to include an end edge portion of a previously printed image on the print-target surface, the end edge portion serving as a connection portion with an image to be printed contiguous to the printed image while causing a capture unit attached to the XY table to scan the print-target surface in XY directions in a state where the capture unit is disposed opposite to the print-target surface, creating a composite print surface which is a plane projection of the print-target surface which is non-plane, by compositing the plurality of subdivided images captured by the capture unit, superimposing the image to be printed contiguous to the printed image (hereinafter, the image is referred to as "image to be drawn") on the composite print surface, and editing the image to be drawn to be continuous with the end edge portion of the printed image, and discharging an ink on the print-target surface to perform printing by a print head attached to the XY table on the basis of an edited image to be drawn which is obtained by editing the image to be drawn.

According to the three-dimensional printing method of the present invention, the composite print surface, which is a plane projection of subdivided images of a print surface having a three-dimensional shape captured by the capture unit attached to the XY table, is created, and printing is performed by an inkjet printer on the basis of the edited image to be drawn, which is obtained by editing the image to be drawn to be superimposed on the composite print surface. Therefore, there is an effect to continuously print a plurality of images on a surface of an object having a three-dimensional shape without gap or overlap.

DETAILED DESCRIPTION

[Overall Configuration of Inkjet Printer]

Figure 1:
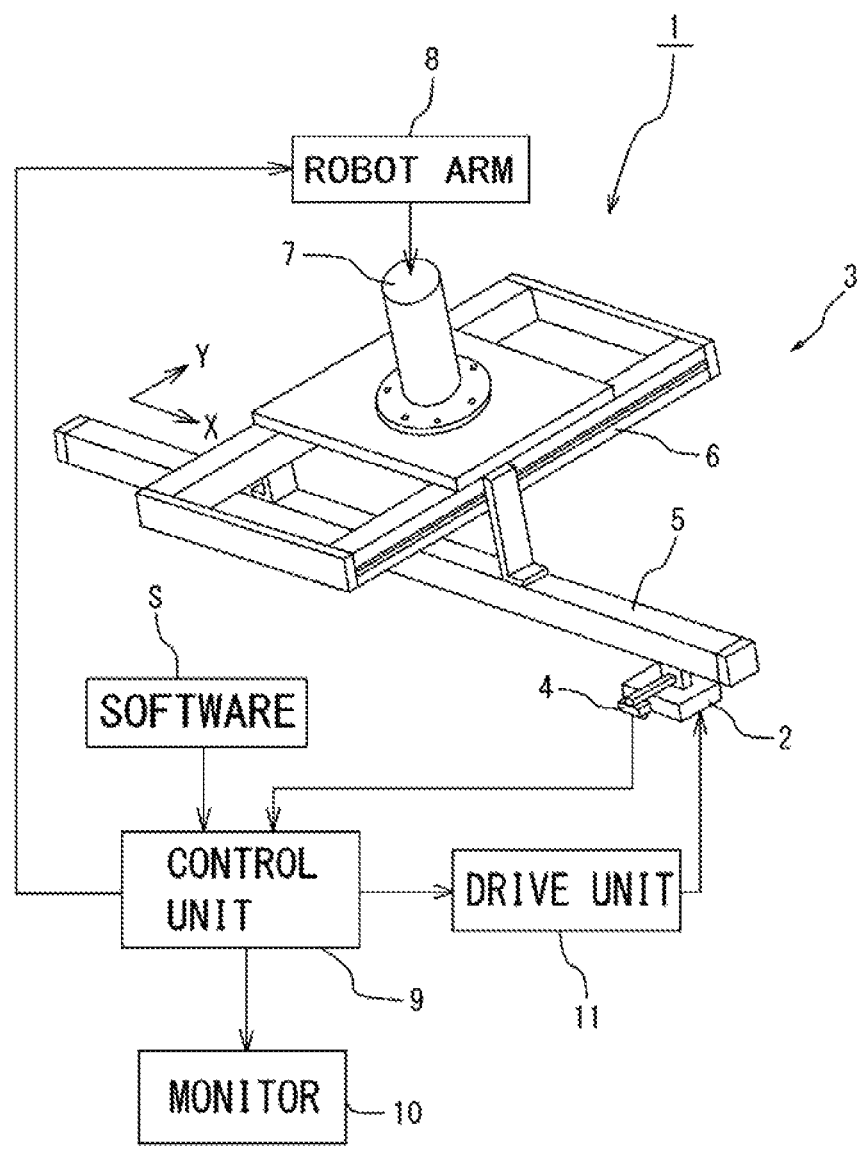
FIG. 1 is a configuration diagram illustrating an embodiment of an inkjet printer implementing a three-dimensional printing method according to the present invention.

A three-dimensional printing method according to the present invention will be described below in detail on the basis of a favorable embodiment. First, a configuration of an inkjet printer that implements the three-dimensional printing method according to the present invention will be described. FIG. 1 is a configuration diagram illustrating a configuration of an inkjet printer to which a three-dimensional printing method according to the present invention is applied. An inkjet printer 1 illustrated in FIG. 1 roughly includes a print head 2 by an inkjet method, a camera 4 as a capture unit disposed in the vicinity of the print head 2, an X-Y table 3 that moves the print head 2 and the camera 4 in an X direction and a Y direction, a control unit 9 that operates the X-Y table 3 and discharges an ink from the print head 2 to control printing on a print-target surface on the basis of image editing software S for editing an image captured by the camera 4 and a preset control program, and a drive unit 11 that causes the camera 4 and the print head 2 to be located at predetermined positions on the basis of control from the control unit 9, and performs capture and print operation.

[Configuration of Each Part]

The print head 2 includes a plurality of nozzles (not illustrated) that discharges an ink toward a coating-target surface of a coating-target object M. Note that the "ink" referred hereto includes "paint". Inks are discharged through the nozzles perpendicularly to the print head 2. That is, an ink discharge surface of the print head 2 is parallel to an X-Y plane formed by the movement of the X-Y table 3, and ink dots discharged through the nozzles are discharged in a direction perpendicular to the X-Y plane. In addition, discharging directions of the inks discharged through the nozzles are parallel to one another. The nozzles are respectively connected with ink tanks of predetermined colors, and the ink tanks are pressurized by a pressurizing device (not illustrated). The nozzles can discharge the ink dots to a print surface of the coating-target object M without problems as long as the distance between the nozzles and the print surface is about 20 cm.

Figure 2:
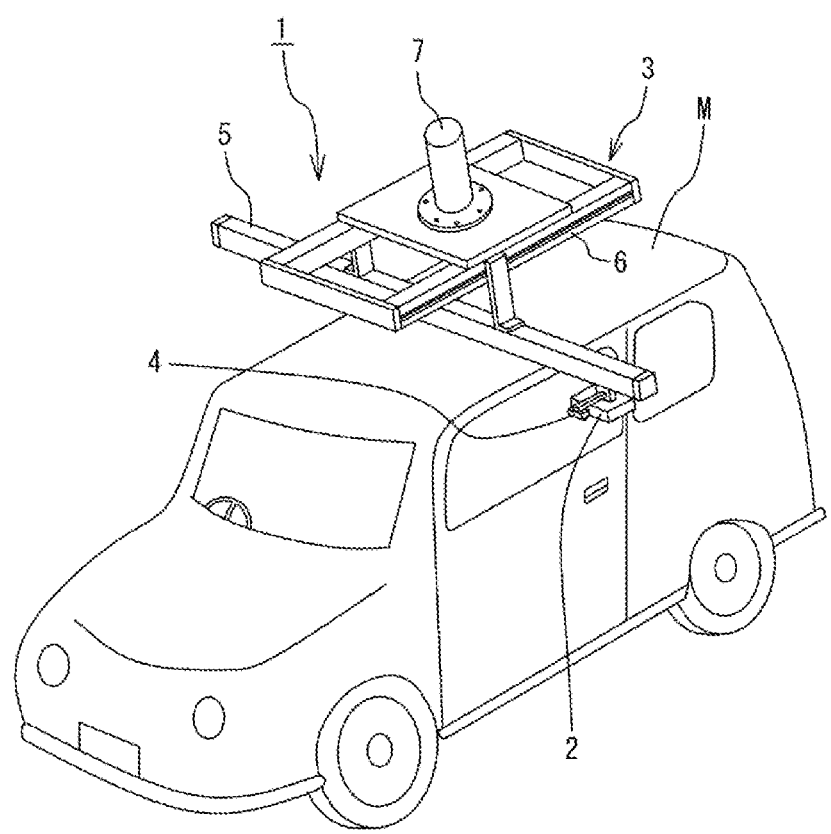
FIG. 2 is an explanatory diagram illustrating an arrangement example of the inkjet printer illustrated in FIG. 1 for an automobile that is an object be printed.
Figure 3:
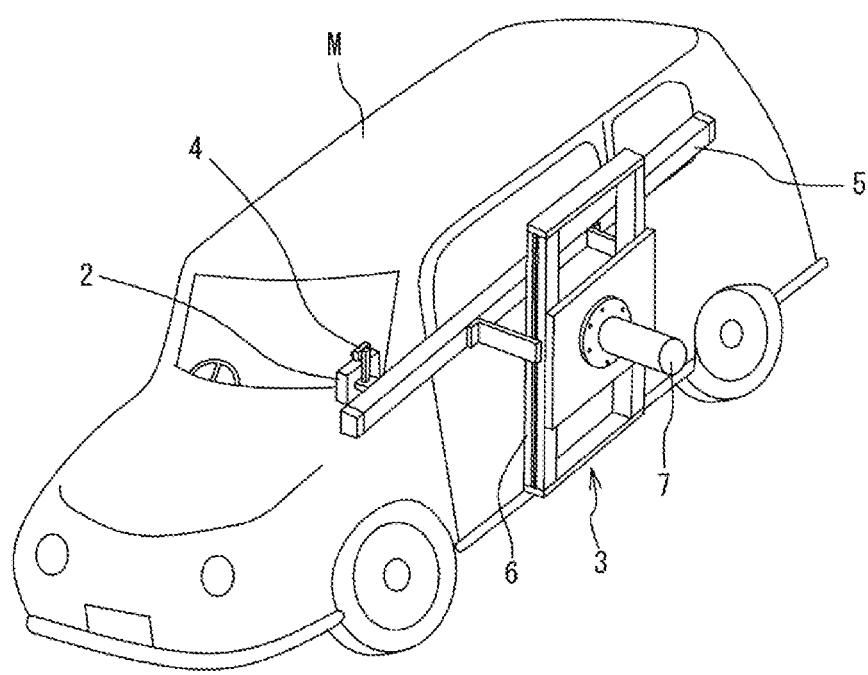
FIG. 3 is an explanatory diagram illustrating another arrangement example of the inkjet printer illustrated in FIG. 1 for the automobile to be printed.

The X-Y table 3 roughly includes an X shaft 5 formed with a linear movement mechanism, and a Y shaft 6 that moves the X shaft in the Y direction while holding the X shaft 5 with two arms, and the print head 2 and the camera 4 described below are attached to a slider (not illustrated) of the X shaft. A shaft 7 is provided on the Y shaft 6 and is held by a robot arm 8, whereby the print head 2 can be freely arranged at a predetermined position where printing is to be performed on the coating-target object M. For example, in a case where the coating-target object M is an automobile, the print head 2 can be arranged at a side position as illustrated in FIG. 2 or arranged on an upper portion as illustrated in FIG. 3. Note that the operation of the robot arm 8 is controlled on the basis of a program stored in advance in the control unit 9.

The camera 4 is disposed on a slider (not illustrated) of the X shaft 5, which is a vicinity of the print head 2, and captures a predetermined area of the print-target surface of the coating-target object M at fixed intervals while moving in X-Y directions. The camera 4 is a so-called digital camera, and a specification of a lens that can capture a plurality of subdivided images for the predetermined area of the print-target surface, as described above, and specifications of a resolution and the like are appropriately selected. The capturing of the plurality of subdivided images of the print-target surface by the camera 4 is continuously and automatically performed according to a program provided in advance in the control unit 9.

The control unit 9 is configured by a so-called microcomputer including a storage device that records and stores various programs, data of captured images, data of images to be printed, and the like, a central processing unit that executes various types of processing according to a program, an input device such as a keyboard and a mouse, and a DVD player and the like as needed. Further, a monitor 10 is included, and the monitor 10 displays input information to the control unit 9, a processing result by the control unit 9, and the like. As will be described below, the control unit 9 performs image processing for a plurality of subdivided image data captured by the camera 4 using image processing software, generates a composite print surface that is a plane projection of the print-target surface which is non-plane of the coating-target object M, and generates an edited image to be drawn B by superimposing, on the composite print surface, an image to be drawn A that is an image to be printed contiguous to an printed image previously printed on the print-target surface, and editing the image to be drawn A to be continuous with an end edge portion of the printed image. For example, the control unit 9 generates, regarding a print image 102b (corresponding to the image to be drawn A) illustrated in FIG. 7C, the edited image to be drawn B by editing (deforming) the print image 102b to be consistent with the composite print surface so as not to form a non-print area 103 between the print image 102b and an adjacent print image 102a. Then, by actually performing printing by the print head 2 on the basis of the edited image to be drawn B, the print image 102b can be printed without a gap between the print image 102b and the printed print image 102a. Note that implementation of the capturing of the plurality of subdivided images by the camera 4 and the printing by discharge of the inks through the nozzles of the print head 2 is performed by the drive unit 11, the operation of which is controlled by the control unit 9.

[Operation of Inkjet Printer and Coating Method by Inkjet Printer]

Next, a three-dimensional printing method according to the present invention will be described together with the operation of the inkjet printer 1 configured as described above. Here, it is assumed that the coating-target object M is a vehicle body of an automobile, an image is printed on a side surface of the automobile that is the coating-target object M, and a next image is printed contiguous to a previously printed image I.

Figure 6A:
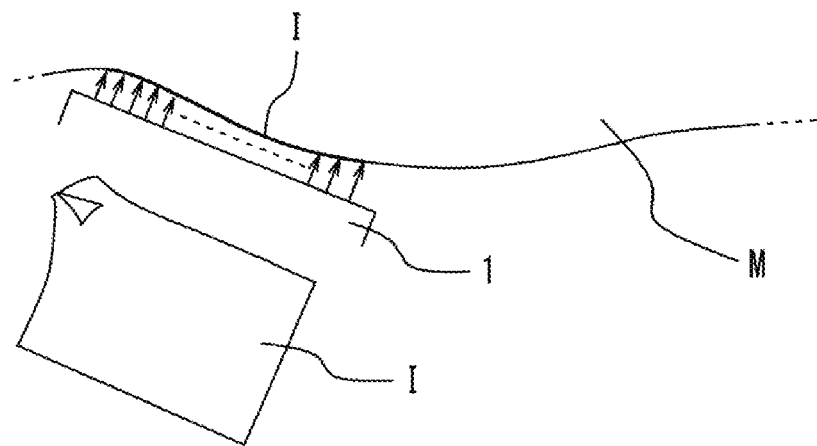
FIG. 6A is a diagram for describing an area where first printing has been completed.
Figure 6B:
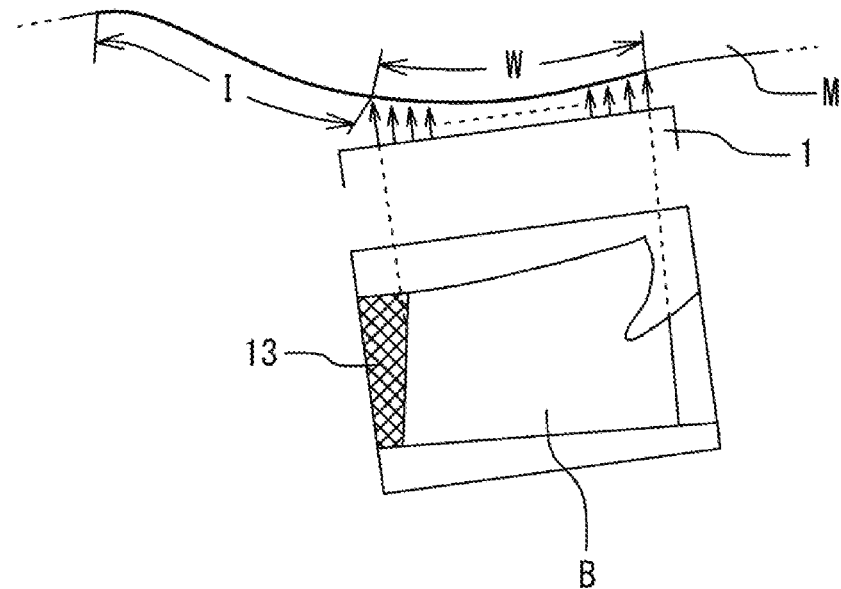
FIG. 6B is an explanatory diagram of an image to be printed next.

[Step 1] Regarding an image to be printed first, there are no specific restrictions concerning a print position, and the image may just be appropriately printed at a position predetermined to a certain extent. To be specific, when the start of printing is instructed via the control unit 9, the drive unit 11 operates the robot arm 8 to cause the X-Y table 3 to locate the print head 2 on the side surface of the coating-target object M, and performs the first printing. For example, the print image I illustrated in FIG. 6A is printed. This printed image I serves as a reference image when the next print image, that is, the edited image to be drawn B (see FIG. 6B) is printed.

Figure 4A:
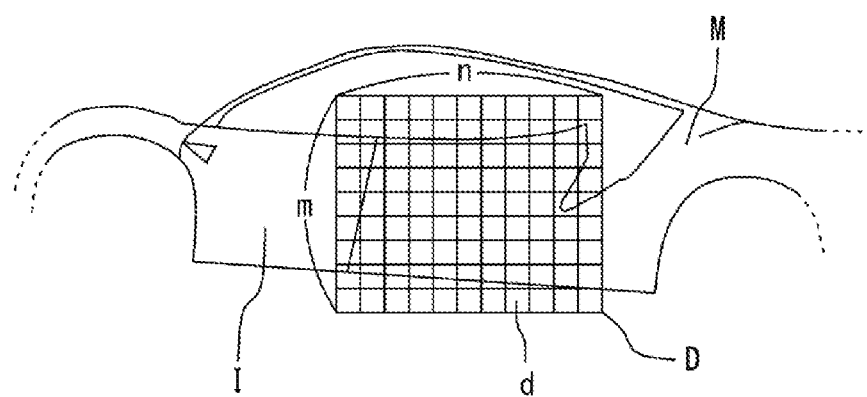
FIG. 4A is an explanatory diagram illustrating capturing of subdivided images by a camera.
Figure 4B:
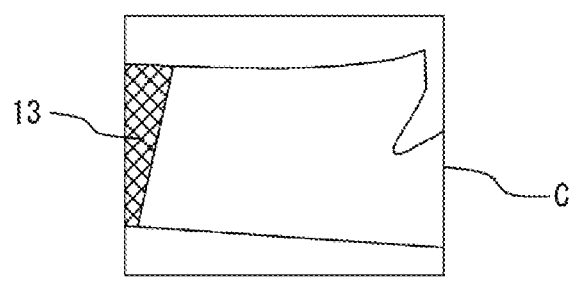
FIG. 4B is a diagram illustrating a composite print surface.
Figure 5A:
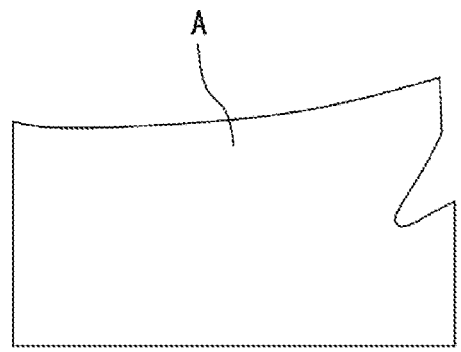
FIG. 5A is a diagram illustrating an image to be drawn.

[Step 2] When the above-described first printing is completed, the next image is printed to be adjacent to and continuous with the printed image I. To be specific, the robot arm 8 is operated via the control unit 9 to locate the X-Y table 3 to face the print-target surface so as to include a position adjacent to the printed image I, that is, an area to be printed next. At this time, the camera 4 is located to include an area including a side contiguous to the printed image I, i.e., a right end portion 13 of the printed image I in the present embodiment, and the area slightly broader than a area in which the image to be drawn A (see FIG. 5A) as the next image should be printed. Then, this area is captured by the camera 4 as subdivided images that are obtained by dividing the area into small areas, for example, divided areas d, each having a size of 20 mm×20 mm (see FIG. 4A). In a case where the area to be printed is m×n, subdivided images divided into about 2,000 to 3,000 images are captured. Then, image data D of the subdivided images is acquired. Note that the captured subdivided images can be displayed on the monitor 10 by the control unit 9.

[Step 3]

Next, the control unit 9 composites the m×n subdivided images captured by the camera 4 to one image. That is, the subdivided images are obtained by capturing the print-target surface of the coating-target object M which is non-plane, and a composite print surface C, which is a plane projection of these subdivided images, is created. Note that the size of the subdivided image is not limited to 20 mm×20 mm, and if the subdivided image is made smaller than the aforementioned size, a composite print surface C with higher precision can be created. Further, in a case where the print-target surface of the coating-target object M does not have much unevenness, a subdivided image having a larger size than the aforementioned size may be used.

[Step 4]

Figure 7A:
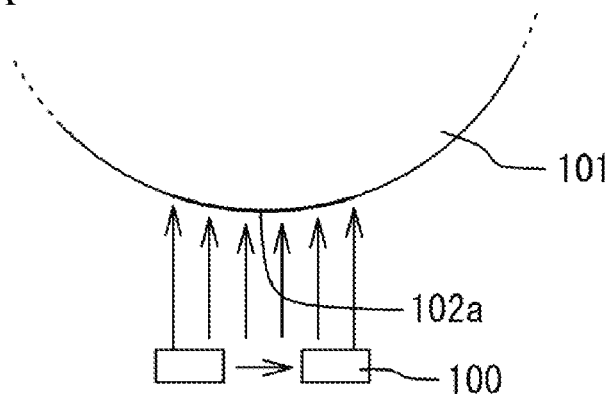
FIG. 7A is an explanatory diagram of a case where an image is printed on a spherical surface by an inkjet printer.
Figure 7B:
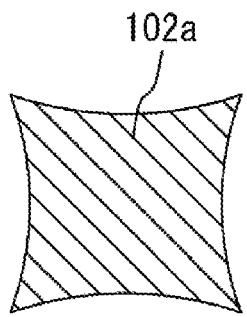
FIG. 7B is an explanatory diagram illustrating a result of a case where a rectangle is printed on a spherical surface.
Figure 7C:
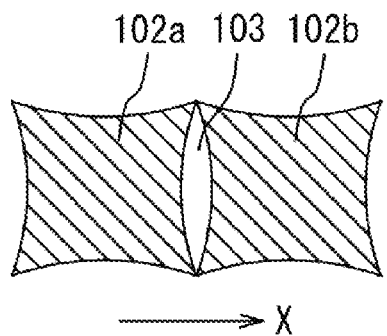
FIG. 7C is an explanatory diagram of a case where rectangles are continuously printed on a spherical surface by an inkjet printer.

Next, the image to be drawn A as the image to be printed next is superimposed on the composite print surface C contiguous to the printed image I, and the image to be drawn A is edited contiguous to the end edge portion of the printed image I. For example, assuming that the print image 102b illustrated in FIG. 7C is the image to be drawn A, image editing is performed to expand a left-side end edge portion of the print image 102b to cover a portion corresponding to the non-print area 103, and the edited image to be drawn B is generated. That is, an image obtained by editing the print image 102b to be continuous with the printed image 102a is the edited image to be drawn B. The generation (editing) of the edited image to be drawn B is executed by the control unit 9 by the image editing software S while watching the monitor 10.

Figure 5B:
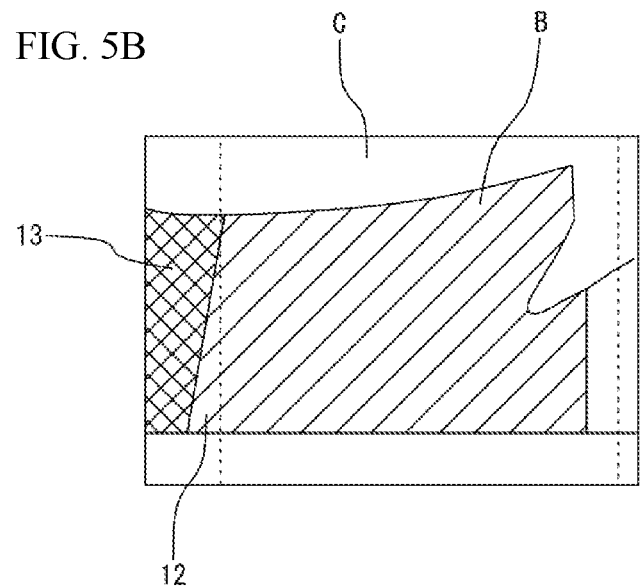
FIG. 5B is a diagram illustrating an edited image to be drawn.

More specifically, the control unit 9 generates one composite print surface C (see FIG. 5B) which is plane projection by compositing the plurality of "m×n" subdivided images captured by the camera 4. Next, the control unit 9 superimposes the image to be drawn A (see FIG. 5A) as the image to be printed contiguous to the printed image I on the composite print surface C, as illustrated in FIG. 5B, and further edits the image to be drawn A to form a correction portion 12 that is expanded to cause a left end portion of the image to be drawn A to be in contact with a boundary of the right end portion 13 of the printed image I, thereby to generate the edited image to be drawn B. Note that "Adobe Photoshop" (registered trademark) of Adobe Systems Incorporated can be used as the image processing software S for generating the edited image to be drawn B from the image to be drawn A, for example.

[Step 5]

Next, the inks are discharged through the nozzles of the inkjet printer onto the print-target surface of the coating-target object M to perform printing on the basis of the created edited image to be drawn B. Note that the X-Y table 3 is held at the same position from the start of capturing of the subdivided images by the camera 4 to termination of the printing of the edited image to be drawn B.

[Step 6]

When the printing of the edited image to be drawn B is completed, the processing of steps 1 to 5 described above is further repeated with reference to a printed image W (see FIG. 6B), whereby a plurality of images can be continuously printed on the coating-target object M. Further, in a case of continuously printing images above, below, or on the right side of the first printed image I, the processing of steps 1 to 5 described above is similarly repeated, whereby a plurality of images can be continuously printed on the coating-target object M.

Effect of Embodiment

As described above, according to the three-dimensional printing method of the present invention, images having continuity without gap or overlap can be printed even in the case of continuously printing a plurality of images on the surface of the three-dimensional coating-target object M. As a result, printing by an inkjet printer can be performed on a vehicle body of an automobile or a body of an aircraft having a three-dimensional surface shape.

Other Embodiments

Note that the present invention is not limited to the above-described embodiment, and various modifications can be made without departing from or altering the technical idea of the present invention. For example, in the above-described embodiment, the coating-target object as the object to be printed has been the vehicle body of an automobile. However, it goes without saying that the present embodiment is applicable to an aircraft, a ship, a railway vehicle, an industrial equipment, or the like having a three-dimensional print surface.

Further, the three-dimensional printing method according to the present invention does not cause an uncoated portion or an overlapping portion even in the case of dividing the surface of the coating-target object having a three-dimensional surface shape into the plurality of areas and performing printing, and therefore uniform coating can be performed. Therefore, the three-dimensional printing method according to the present invention is widely adoptable not only to printing of design images and the like but also to coating with a single color. The type of the ink discharged through the print head 2 can be appropriately selected from aqueous inks and oil inks depending on the material that composes the coating-target object, and the like.

What is claimed is:

1. An image forming apparatus comprising:
an image forming unit configured to form a first image on a surface of an object;
a capture unit configured to capture a predetermined area of the first image including an edge portion of the first image by dividing the predetermined area into a plurality of areas to obtain a corresponding plurality of sets of divided captured image data; and
a processor configured to: (i) compose the plurality of sets of divided captured image data to obtain composite captured image data; and (ii) correct image data of a second image to obtain corrected image data of the second image such that the corrected image data of the second image is continuous with image data of the first image included in the composite captured image data,
wherein the image forming unit is further configured to form the second image on the surface of the object based on the corrected image data of the second image.

2. The image forming apparatus of claim 1, wherein the image forming unit is configured to continuously print a three-dimensional coating on the surface of the object so as to form at least one of the first image and the second image.

3. The image forming apparatus of claim 1, further comprising a drive unit configured to drive the image forming unit and the capture unit to be located at predetermined positions.

4. The image forming apparatus of claim 1, further comprising an X-Y table configured to move in an X direction and a Y direction, wherein the image forming unit and the capture unit are mounted on the X-Y table.

5. The image forming apparatus of claim 4, further comprising a robot arm configured to locate the X-Y table so as to face the surface of the object.

6. The image forming apparatus of claim 1, further comprising a monitor configured to display at least one of input information and a processing result.

7. The image forming apparatus of claim 1, wherein the image forming unit is a print head.

8. The image forming apparatus of claim 1, wherein the capture unit is a camera.

9. The image forming apparatus of claim 1, wherein the object is spherical.

10. The image forming apparatus of claim 1, wherein the object is an automobile and the image forming apparatus is configured to be mounted on the automobile.

11. An image forming method comprising:
forming a first image on a surface of an object;
capturing a predetermined area of the first image including an edge portion of the first image by dividing the predetermined area into a plurality of areas to obtain a corresponding plurality of sets of divided captured image data;
composing the plurality of sets of divided captured image data to obtain composite captured image data and correcting image data of a second image to obtain corrected image data of the second image such that the corrected image data of the second image is continuous with image data of the first image included in the composite captured image data; and
forming the second image on the surface of the object based on the corrected image data of the second image.

12. The image forming method of claim 11, wherein at least one of the forming the first image on the surface of the object and the forming the second image on the surface of the object includes continuously printing a three-dimensional coating on the surface of the object.

13. The image forming method of claim 11, further comprising driving an image forming unit and an capture unit to be located at predetermined positions for forming the first image on the surface of the object and capturing the predetermined area of the first image.

14. The image forming method of claim 13, wherein:
the driving the image forming unit and the capture unit to be located at predetermined positions includes moving an X-Y table on which the image forming unit and the capture unit are mounted.

15. The image forming method of claim 14, further comprising actuating a robot arm for locating the X-Y table so as to face the surface of the object.

16. The image forming method of claim 11, further comprising displaying at least one of input information and a processing result.

17. The image forming method of claim 11, wherein at least one of the forming the first image of the surface of the object and the forming the second image on the surface of the object includes inkjet printing a coating on the surface of the object.

18. The image forming method of claim 11, wherein the capturing the predetermined area of the first image includes taking pictures with a camera.

19. The image forming method of claim 11, wherein the object is spherical.

20. The image forming method of claim 11, wherein the object is an automobile.

* * * * *